(12) United States Patent
Kamangar

(10) Patent No.: US 7,996,874 B2
(45) Date of Patent: *Aug. 9, 2011

(54) PAUSING ONE OR MORE ADS, ONE OR MORE AD GROUPS, AND/OR ONE OR MORE AD CAMPAIGNS

(75) Inventor: Salar Arta Kamangar, Palo Alto, CA (US)

(73) Assignee: Google, Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/431,902

(22) Filed: Apr. 29, 2009

(65) Prior Publication Data

US 2009/0216647 A1    Aug. 27, 2009

Related U.S. Application Data

(63) Continuation of application No. 10/340,867, filed on Jan. 10, 2003, now Pat. No. 7,546,625.

(51) Int. Cl.
*H04N 7/173* (2006.01)

(52) U.S. Cl. .............................. 725/93; 725/97; 725/116

(58) Field of Classification Search ........... 725/124–135
See application file for complete search history.

(56) References Cited

U.S. PATENT DOCUMENTS

| | | | |
|---|---|---|---|
| 6,182,072 B1 * | 1/2001 | Leak et al. ....................... | 707/10 |
| 6,411,992 B1 * | 6/2002 | Srinivasan et al. ............. | 709/218 |
| 6,772,433 B1 * | 8/2004 | LaJoie et al. .................... | 725/52 |
| 6,859,839 B1 * | 2/2005 | Zahorjan et al. ............... | 709/231 |
| 2003/0101454 A1 * | 5/2003 | Ozer et al. ....................... | 725/42 |

OTHER PUBLICATIONS

User Guide: A Complete Guide to AdForce, Version 2.6 (AdForce, Inc., Cupertino, CA, 1998).

* cited by examiner

*Primary Examiner* — Joseph P Hirl
*Assistant Examiner* — Mushfikh Alam
(74) *Attorney, Agent, or Firm* — John C. Pokotylo; Straub & Pokotylo

(57) ABSTRACT

Helping advertisers by simplifying the management of interactive advertising. Such simplification can by achieved by allowing an advertiser to pause the serving of an ad, or some grouping of ads. The pausing may continue for a predetermined time period, until a specified time and/or date, or until a restart is selected.

10 Claims, 6 Drawing Sheets

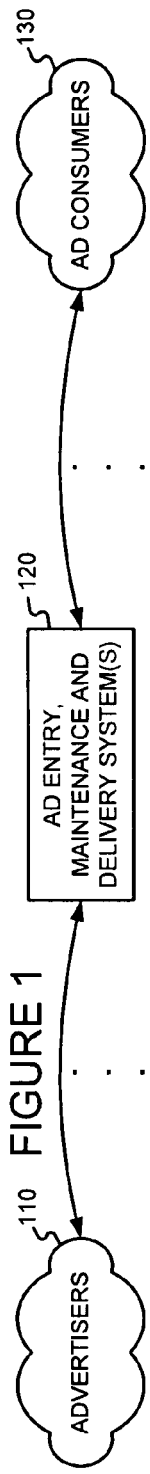
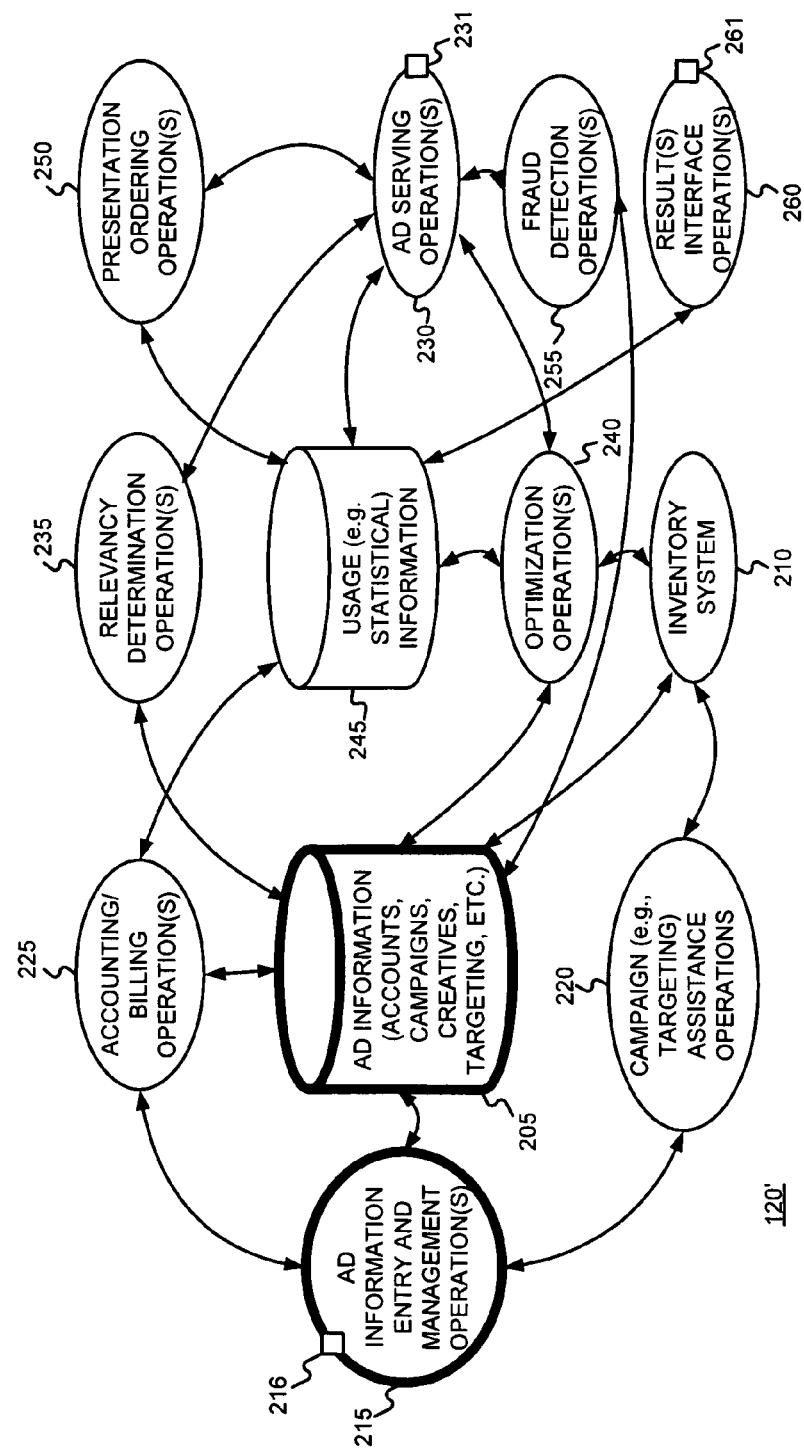

PAUSING ONE OR MORE ADS, ONE OR MORE AD GROUPS, AND/OR ONE OR MORE AD CAMPAIGNS

§0. RELATED APPLICATION(S)

This application is a continuation of U.S. patent application Ser. No. 10/340,867 (referred to as the '867 application and incorporated herein by reference), titled "PAUSING ONE OR MORE ADS, ONE OR MORE AD GROUPS, AND/OR ONE OR MORE AD CAMPAIGNS", filed on Jan. 10, 2003 now U.S. Pat. No. 7,546,625 and listing Salar Arta KAMANGAR as the inventor, which issued as U.S. Pat. No. 7,546,625 on Jun. 9, 2009.

§1. BACKGROUND OF THE INVENTION

§1.1 Field of the Invention

The present invention concerns advertising. In particular, the present invention concerns managing the serving of one or more advertisements to be served in an interactive advertising environment.

§1.2 Related Art

Advertising using traditional media, such as television, radio, newspapers and magazines, is well known. Advertisers have used these types of media to reach a large audience with their advertisements ("ads"). To reach a more responsive audience, advertisers have used demographic studies. For example, advertisers may use broadcast events such as football games to advertise beer and action movies to a younger male audience. Similarly, advertisers may use magazines that reach a relatively affluent readership to advertise luxury items such as expensive watches and luxury automobiles. However, even with demographic studies and entirely reasonable assumptions about the typical audience of various media outlets, advertisers recognize that much of their ad budget is simply wasted. Unfortunately, it is very difficult to identify and eliminate such waste.

Recently, advertising over more interactive media has become popular. For example, as the number of people using the Internet has exploded, advertisers have come to appreciate media and services offered over the Internet as a potentially powerful way to advertise.

Advertisers have developed several strategies in an attempt to maximize the value of such advertising. In one strategy, advertisers use popular presences or means for providing interactive media or services (referred to as "Web sites"in the specification without loss of generality) as conduits to reach a large audience. Using this first approach, an advertiser may place ads on the home page of the New York Times Web site, or the USA Today Web site, for example. In another strategy, an advertiser may attempt to target its ads to more narrow niche audiences, thereby increasing the likelihood of a positive response by the audience. For example, an agency promoting tourism in the Costa Rican rainforest might place ads on the ecotourism-travel subdirectory of the Yahoo Web site.

Regardless of the strategy, Web site-based ads (also referred to as "Web ads") are typically presented to their advertising audience in the form "banner ads"—i.e., a rectangular box that includes graphic components. When a member of the advertising audience (referred to as a "viewer"or "user"in the Specification without loss of generality) selects one of these banner ads by clicking on it, embedded hypertext links typically direct the viewer to the advertiser's Web site. This process, wherein the viewer selects an ad, is commonly referred to as a "click-through"(or more generally, "selection"). The ratio of the number of click-throughs to the number of impressions of the ad (i.e., the number of times an ad is displayed) is commonly referred to as the "click-through rate"of the ad.

Online advertising has attracted a diverse group of advertisers—from large-multinational corporations to the smallest businesses. Some outlets for online advertisements offer in-person assistance to help advertisers set up and manage their advertisement(s). However, this such in-person assistance adds costs to the outlets, and therefore to the advertiser. Some outlets have provided self-service tools to help advertisers set up and manage their advertisement(s). However there is an ongoing need to provide simple, yet powerful tools to help advertisers create and manage their advertisement(s).

§2. SUMMARY OF THE INVENTION

The present invention simplifies the management of interactive advertising by allowing an advertiser to pause the serving of an ad, or some grouping of ads. The a pausing may continue for a predetermined time period, until a specified time and/or date, or until a restart is selected.

§3. BRIEF DESCRIPTION OF THE DRAWINGS

FIG. 1 is a high-level diagram showing parties or entities that can interact with an advertising system.

FIG. 2 is a bubble chart of an advertising environment in which, or with which, the present invention may operate.

Figure 5:
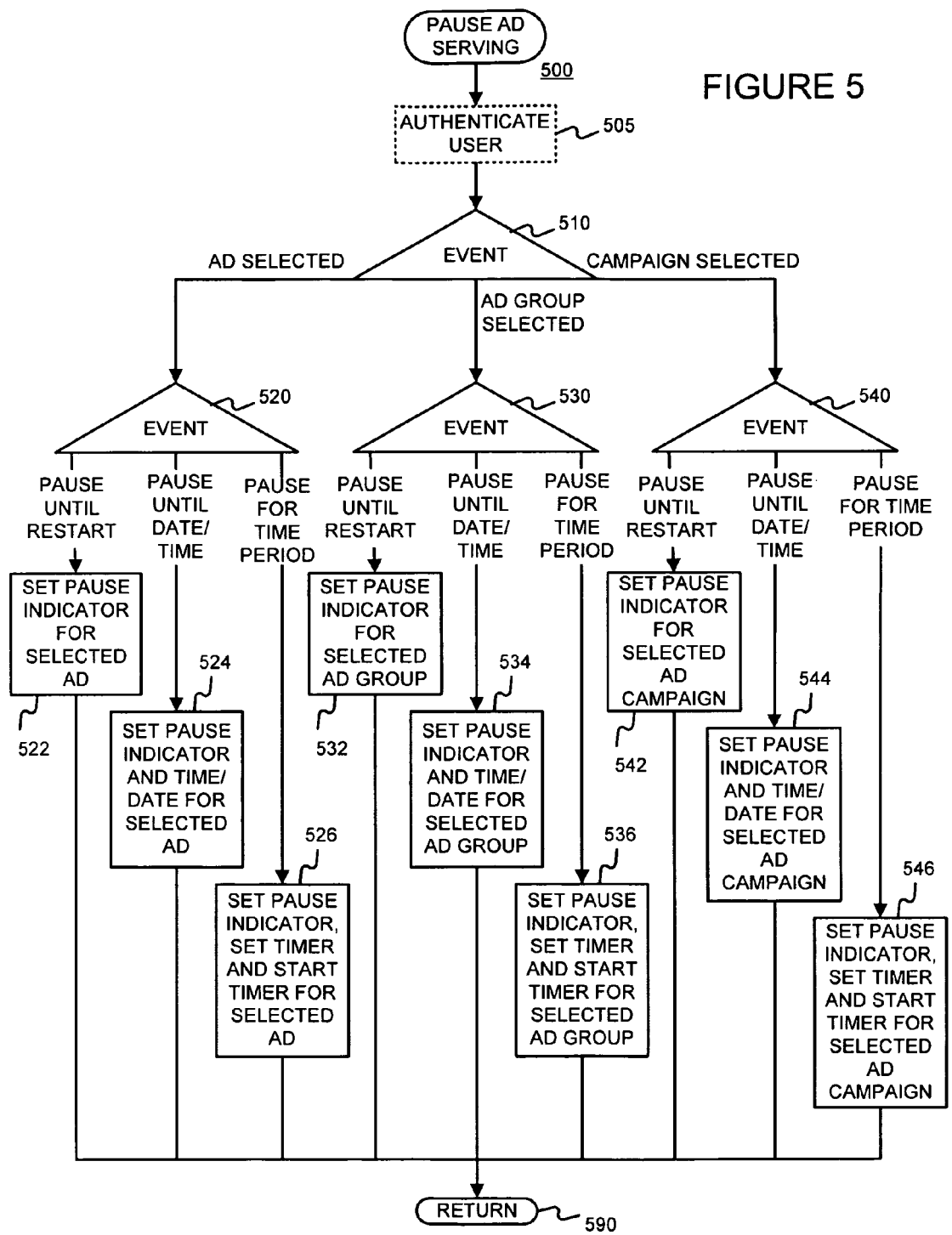
Figure 6:
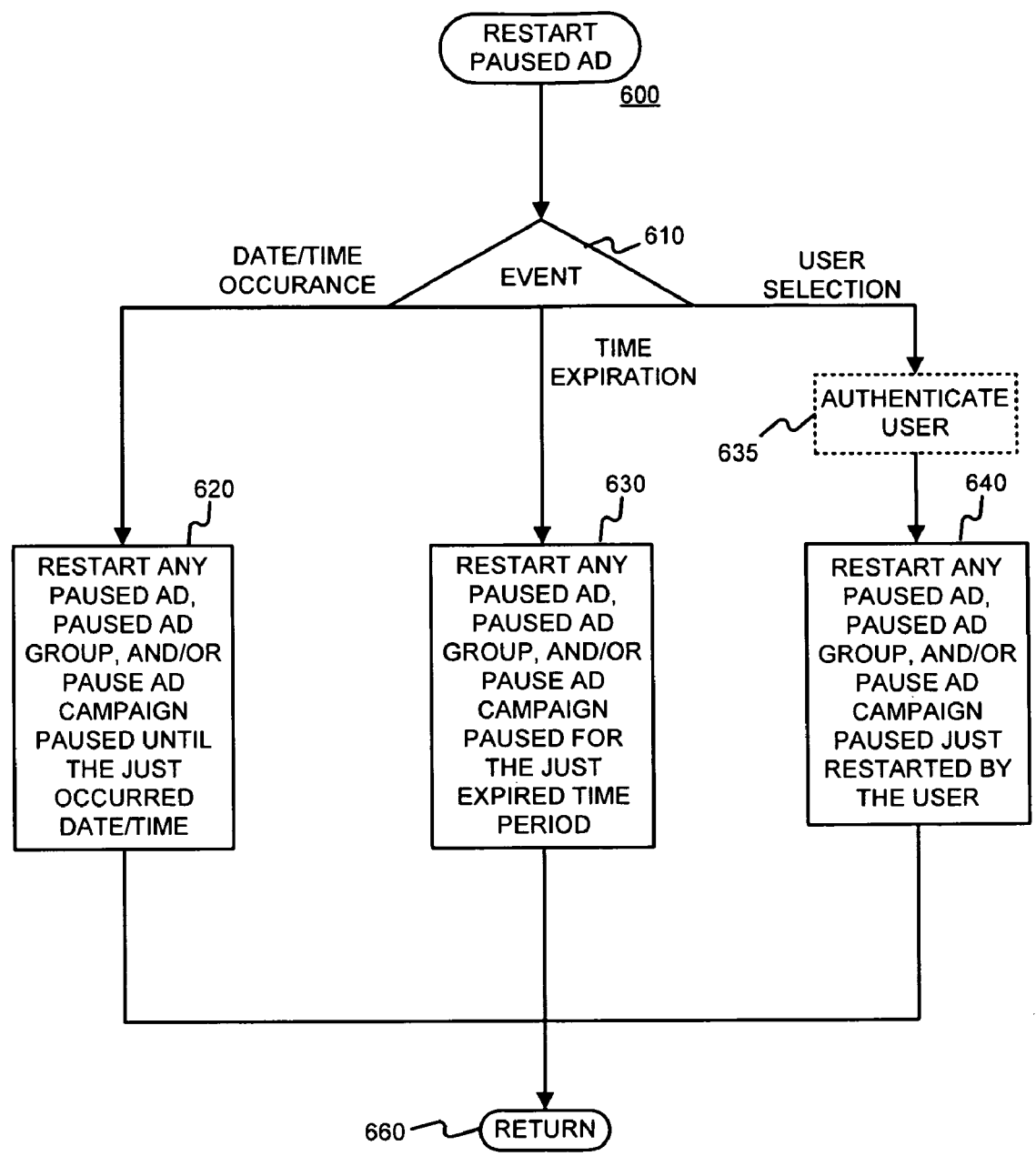
Figure 7:
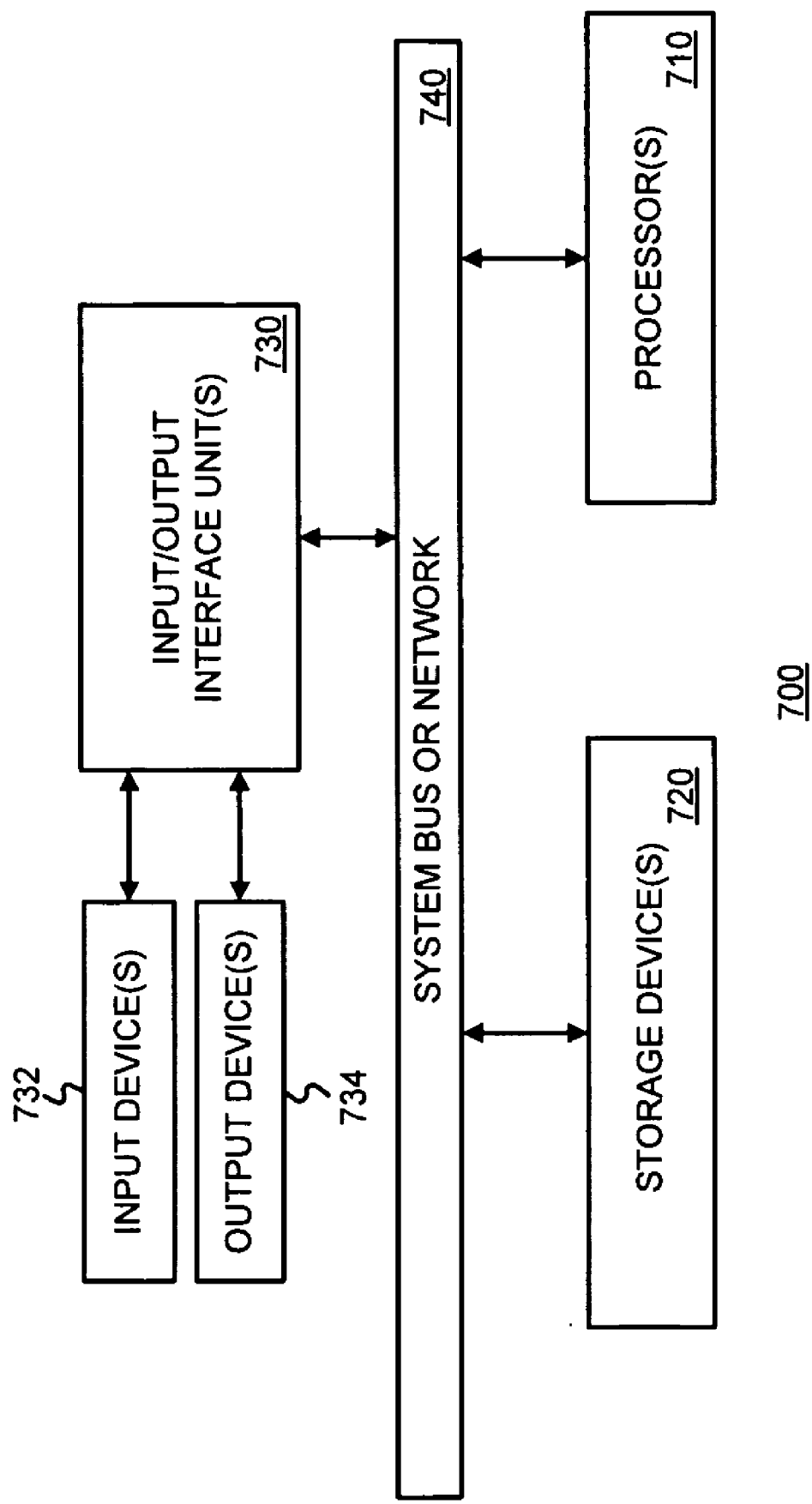

FIG. 5 is a flow diagram of an exemplary method that may be used to pause one or more ads, one or more ad groups, and/or one or more ad campaigns, in a manner consistent with the principles of the present invention FIG. 6 is a flow diagram of an exemplary method that may be used to restart one or more ads, one or more ad groups, and/or one or more ad campaigns in a manner consistent with the principles of the present invention FIG. 7 is a high-level block diagram of apparatus that may be used to perform at least some of the various operations that may be performed consistent with the principles of the present invention.

§4. DETAILED DESCRIPTION

The present invention may involve novel methods, apparatus, message formats and/or data structures for simplifying the management of advertising. The following description is presented to enable one skilled in the art to make and use the invention, and is provided in the context of particular applications and their requirements. Various modifications to the disclosed embodiments will be apparent to those skilled in the art, and the general principles set forth below may be applied to other embodiments and applications. Thus, the present invention is not intended to be limited to the embodiments shown and the inventor regards his invention any patentable subject matter described below.

In the following, environments in which the present invention may operate are described in §4.1 Then, exemplary embodiments of the present invention are described in §4.2. Finally, some conclusions regarding the present invention are set forth in §4.3.

§4.1 Environments in Which, or With Which, the Present Invention May Operate

§4.1.1 Exemplary Advertising Environment

FIG. 1 is a high level diagram of an advertising environment. The environment may include an ad entry, maintenance and delivery system 120. Advertisers 110 may directly, or indirectly, enter, maintain, and track ad information in the system 120. The ads may be in the form of graphical ads such as so-called banner ads, text only ads, text-based ads, audio ads, video ads, ads combining various media types, etc. Ad consumers 130 may submit requests for ads to, accept ads responsive to their request from, and provide historical or usage information to, the system 120. Although not shown, other entities may provide historical or usage information (e.g., whether or not a conversion or click-through related to the ad occurred) to the system 120.

One example of an ad consumer 130 is a general content server which receives requests for content (e.g., articles, discussion threads, music, video, graphics, search results, web page listings, etc.), and retrieves the requested content in response to, or otherwise services, the request. The content server may submit a request for ads to the system 120. Such an ad request may include a number of ads desired. The ad request may also include content request information. This information may include the content itself (e.g., a page), a category corresponding to the content or the content request (e.g., arts, business, computers, arts-movies, arts-music, etc.), part or all of the content request, content age, content type (e.g., text, graphics, video, audio, mixed media, etc.), geolocation information, etc.

The content server may combine the requested content with one or more of the advertisements provided by the system 120. This combined information including the content and advertisement(s) is then forwarded towards the end user that requested the content, for presentation to that user. Finally, the content server may transmit information about the ads and how the ads are to be rendered (e.g., position, click-through or not, impression time, impression date, size, conversion or not, etc.) back to the system 120. Alternatively, or in addition, such information may be provided back to the system 120 by some other means.

Another example of an ad consumer 130 is a search engine. A search engine may receive queries for search results. In response, the search engine may retrieve relevant search results (e.g., from an index of Web pages). An exemplary search engine is described in the article S. Brin and L. Page, "The Anatomy of a Large-Scale Hypertextual Search Engine," *Seventh International World Wide Web Conference*, Brisbane, Australia and in U.S. Pat. No. 6,285,999 (both incorporated herein by reference). Such search results may include, for example, lists of Web page titles, snippets of text extracted from those Web pages, and hypertext links to those Web pages, and may be grouped into a predetermined number of (e.g., ten) search results.

The search engine may submit a request for ads to the system 120. The request may include a number of ads desired. This number may depend on the search results, the amount of screen or page space occupied by the search results, the size and shape of the ads, etc. In one embodiment, the number of desired ads will be from one to ten, and preferably from three to five. The request for ads may also include the query (as entered or parsed), information based on the query (such as geolocation information, whether the query came from an affiliate and an identifier of such an affiliate), and/or information associated with, or based on, the search results. Such information may include, for example, identifiers related to the search results (e.g., document identifiers or "docIDs"), scores related to the search results (e.g., information retrieval ("IR") scores such as dot products of feature vectors corresponding to a query and a document, Page Rank scores, and/or combinations of IR scores and Page Rank scores), snippets of text extracted from identified documents (e.g., WebPages), full text of identified documents, feature vectors of identified documents, etc.

Figure 3:
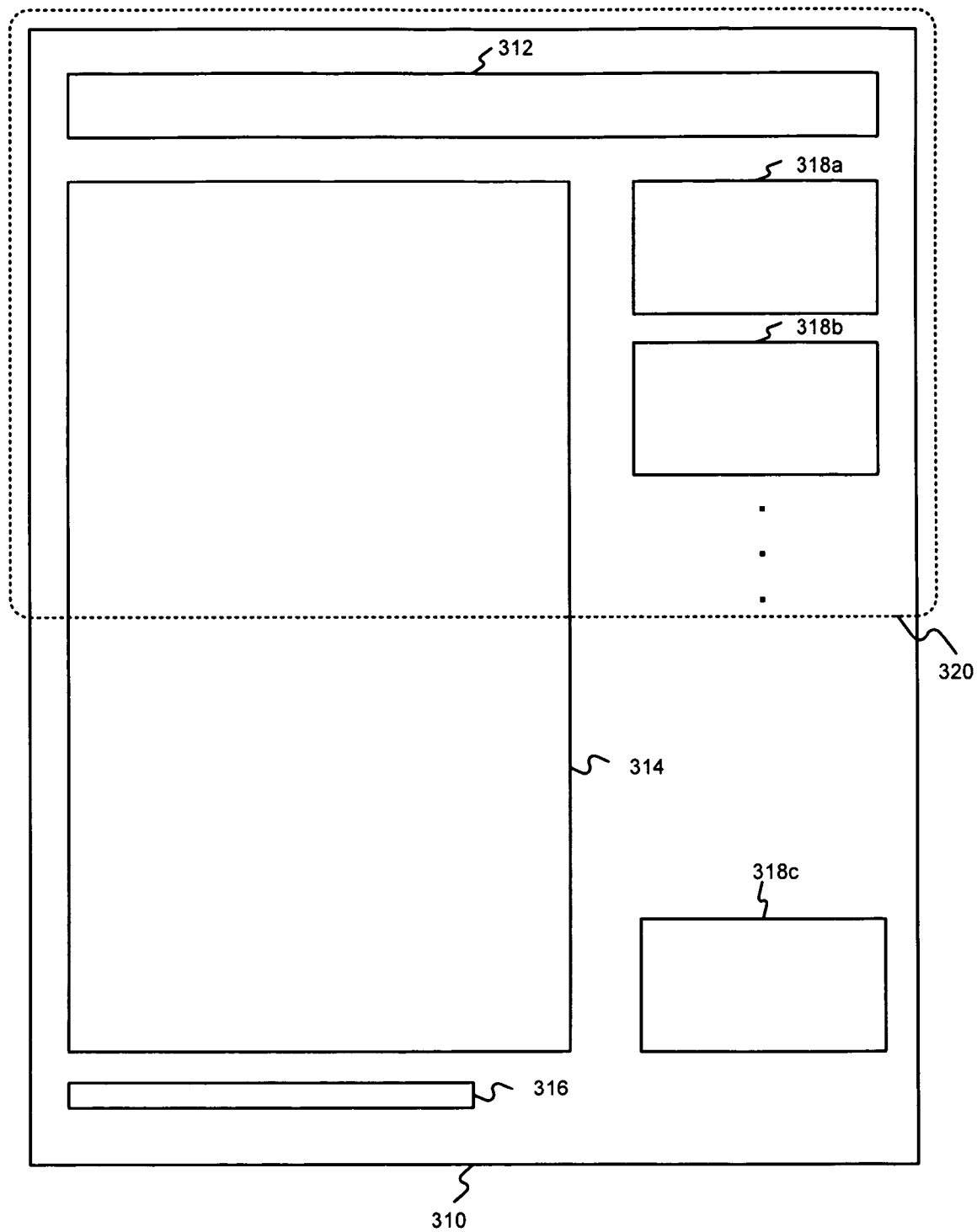
FIG. 3 is a block diagram of a Web page that may be generated by a page assembly operation of an ad consumer, for rendering on a viewer's screen.

The search engine may combine the search results with one or more of the advertisements provided by the system 120. This combined information including the search results and advertisement(s) is then forwarded towards the user that requested the content, for presentation to the user. For example, FIG. 3 is an abstract illustration of a display page 310 that may be provided by the search engine. The outline 320 depicted with dashed lines corresponds to a portion of the display page 310 that may be viewed on a typical personal computer display screen at a typical resolution. The exemplary display page 310 may include header information 312 (e.g., the name of search engine host), trailer information 316 (e.g., copyright, navigational hypertext links, etc.), a plurality of search results 314 and a plurality of ads 318a, 318b, and 318c. The search results 314 are maintained as distinct from the ads 318, so as not to confuse the user between paid advertisements and presumably neutral search results. Although FIG. 3 shows only three ads 318, embodiments consistent with the principles of the present invention may have more or less ads. For example, ten search results combined with ten ads has been found to be effective.

Finally, the search engine may transmit information about the ad and/or how the ad was rendered, or to be rendered (e.g., position, click-through or not, impression time, impression date, size, conversion or not, etc.) back to the system 120. Alternatively, or in addition, such information may be provided back to the system 120 by some other means.

§4.1.2 Exemplary Ad Entry, Maintenance and Delivery Environment

FIG. 2 illustrates an exemplary ad system 120' with which, or in which, the present invention may be used. The exemplary ad system 120' may include an inventory system 210 and may store ad information 205 and usage or historical (e.g., statistical) information 245. The exemplary system 120' may support ad information entry and management operation(s) 215, campaign (e.g., targeting) assistance operation(s) 220, accounting and billing operation(s) 225, ad serving operation(s) 230, relevancy determination operation(s) 235, optimization operations 240, presentation ordering operations 250, fraud detection operation(s) 255, and result(s) interface operation(s) 260. Advertisers 110 may interface with the system 120' via the ad information entry and management operation(s) 215 as indicated by interface 216. Ad consumers 130 may interface with the system 120' via the ad serving operation(s) 230 as indicated by interface 231. Ad consumers 130 or other entities (not shown) may also interface with the system 120' via results interface operation(s) 260 as indicated by interface 261.

The ad information 205 can be entered and managed via the ad information entry and management operation(s) 215. Campaign (e.g., targeting) assistance operation(s) 220 can be employed to help advertisers 110 generate effective ad campaigns. The campaign assistance operation(s) 220 can use information provided by the inventory system 210, which, in the context of advertising for use with a search engine, may track all possible ad impressions, ad impressions already reserved, and ad impressions available for given keywords. The ad serving operation(s) 230 may service requests for ads from ad consumers 130. The ad serving operation(s) 230 may use relevancy determination operation(s) 235 to determine candidate ads for a given request. The ad serving operation(s) 230 may then use optimization operation(s) 240 to select a final set of one or more of the candidate ads. That is, the relevancy determination operation(s) may be used to determine ads that may be served. The optimization operation(s) may then determine whether or not each of the candidate ads is, in fact, served. The ad serving operation(s) 230 may use presentation ordering operation(s) 250 to order the presentation of the ads to be returned. The fraud detection operation(s) 255 can be used to reduce fraudulent use of the advertising system (e.g., by advertisers), such as through the use of stolen credit cards. The result(s) interface operation(s) 260 may be used to accept result information (from the ad consumers 130 or some other entity) about an ad actually served, such as whether or not click-through occurred, whether or not conversion occurred (e.g., whether the sale of an advertised item or service was initiated or consummated within a predetermined time from the rendering of the ad), etc. Such result(s) information may be accepted at interface 261 and may include information to identify the ad and time the ad was served, as well as the associated result.

The principles of the present invention may be applied to the ad information entry and management operation(s) 215 and may affect the ad information 205. More specifically, the principles of the present invention may be applied to simplify ad management.

§4.2 Exemplary Embodiments

§4.2.1 Exemplary Data Structures

Figure 4:
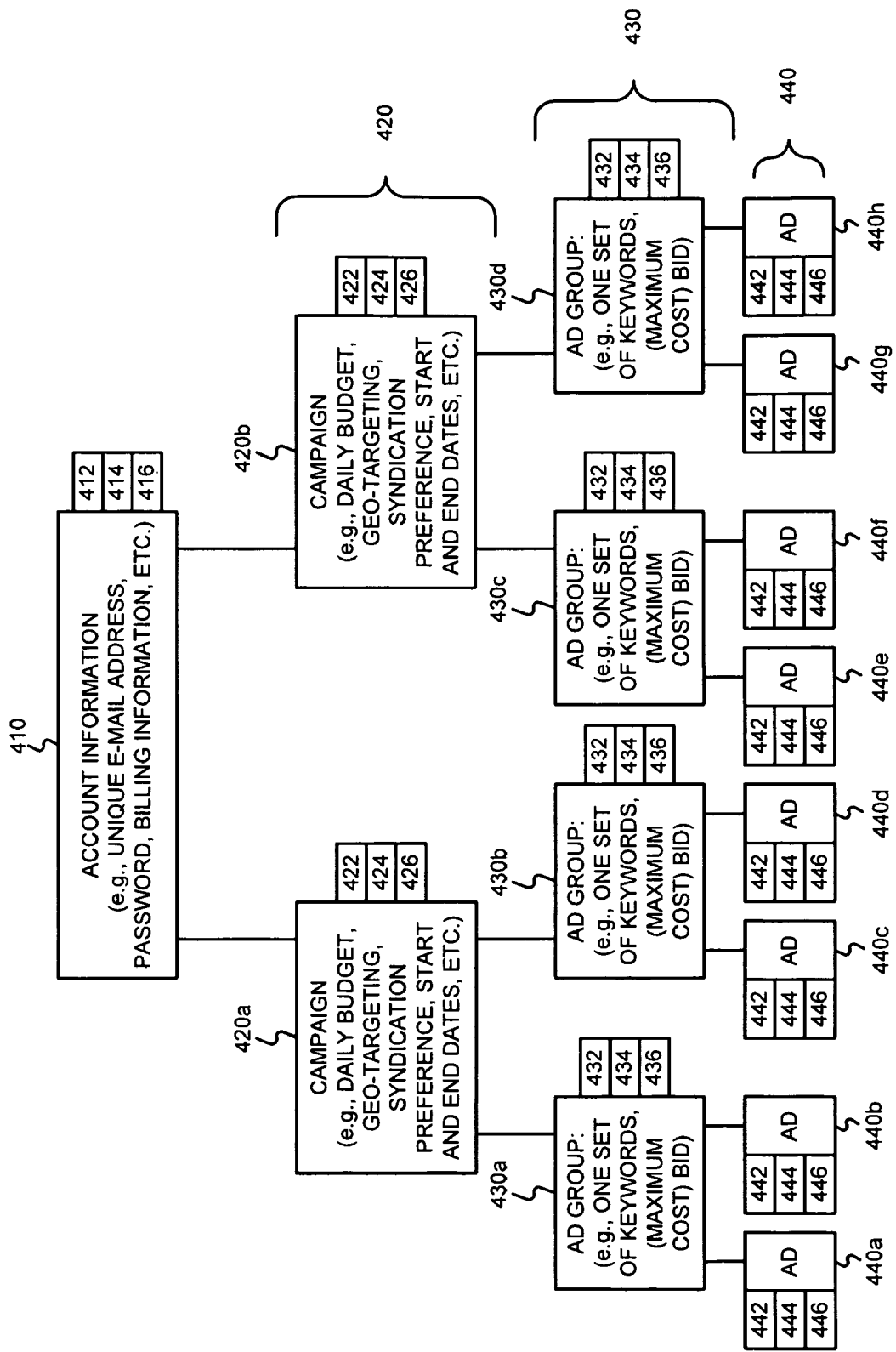
FIG. 4 is a block diagram illustrating an exemplary interrelationship of advertising information that may be used by the present invention.

In one embodiment of the present invention, which may be used in the exemplary ad system 120', an advertising program includes information concerning accounts, campaigns, creatives, targeting, etc. FIG. 4 illustrates an exemplary interrelationship 400 of advertising information, some of which information may be organized in a manner consistent with the principles of the present invention. As shown, account information 410 may include, for example, a unique e-mail address, a password, billing information (e.g., a billing address, a credit card, etc.), etc. The account information 410 may also include a pause indicator 412, a pause countdown timer value 414, and/or a pause until date and/or time value 416. Accordingly, the term "account" relates to information for a given advertiser.

Account information 410 may be associated with information 420 about one or more campaigns. Campaign information 420 may include, for example, one or more budgets for one or more time periods (e.g., a daily budget), geo-targeting information, syndication preference information, start and end dates of the campaign, etc. For example, Honda may have one advertising campaign for its automobile line, and a separate advertising campaign for its motorcycle line. Campaign information 420 may also include a pause indicator 422, a pause countdown timer value 424, and/or a pause until date and/or time value 426.

Each campaign may be associated with information 430 about one or more ad groups. Ad group information 430 may include, for example, keywords (which may be used by the relevancy determination operation(s) to decide whether or not to serve an ad), and cost information, such as a maximum cost bid for example. Ad group information 430 may also include a pause indicator 432, a pause countdown timer value 434, and/or a pause until date and/or time value 436.

Each ad group may be associated with information 440 about one or more ads. Ad information 440 may include, for example, content for the ad, a unique identifier, historical information about the ad or its performance, etc. Ad information 440 may also include a pause indicator 442, a pause countdown timer value 444, and/or a pause until date and/or time value 438.

Referring to both FIG. 2 and FIG. 4, if an ad is "paused", it should not be served. This can be accomplished in a number of ways. For example, the ad can be ignored or filtered out by the relevancy determination operation(s) 235, filtered out by the presentation ordering operation(s) 250, or filtered out by the ad serving operation(s) 230. If an ad group is "paused", all ads belonging to the ad group will also be paused (unless restarted). Thus, for example, if ad group 430b is paused, ads 440c and 440d will be paused. In one embodiment, an authorized user can restart an ad belonging to a paused ad group. For example, an authorized user could restart ad 440d, while ad 440c remains paused. When an ad group is restarted, all ads belonging to the ad group should be restarted.

If an ad campaign is paused, all ad groups belonging to the ad campaign, and consequently all ads belonging to such ad groups, will also be paused (unless restarted). Thus for example, if ad campaign 420b is paused, ad groups 430c and 430d, and ads 440e, 440f, 440g and 440h will be paused. In one embodiment, an authorized user can restart an ad group belonging to a paused ad campaign.

Finally, if an account is paused, all ad campaigns, ad groups and ads under that account will also be paused (unless restarted).

As can be appreciated from the forgoing, given the hierarchical relationship between ad accounts, ad campaigns, ad groups and ads, changes (pause or restart) to an information component should be made to propagate down to sub-components. Changes to sub-components should not propagate up.

Although the embodiment of the invention described above was applied to hierarchical advertising information, the principles of pausing and restarting an ad can be applied to any type of ad information. Further, "paused" may be broadly construed to include indefinitely stopped.

§4.2.2 Exemplary Methods

FIG. 5 is a flow diagram of an exemplary method 500 that may be used to pause an ad account, an ad campaign, an ad group and/or an ad in a manner consistent with the principles of the present invention. A user may be authenticated (Block 505). Various branches of the method 500 may be triggered in response to various events (Event Block 510). For example, if an ad is selected a further event is checked (Event Block 520). If a selected ad is paused until manual restart, the pause indicator for the ad is set (Block 522). If a selected ad is paused until date/time, the pause indicator for the ad is set and the pause until date/time for the ad is set (Block 524). Finally, if a selected ad is paused for a given time period, the pause indicator for the ad is set, a paused period is accepted or otherwise set, and a pause period countdown timer is started (Block 526).

Referring back to event block 510, if an ad group is selected a further event is checked (Event Block 530). If a selected ad group is paused until manual restart, the pause indicator for the ad group (as well as the pause indicator(s) for any ad(s) belonging to the ad group) is set (Block 532). If a selected ad group is paused until date/time, the pause indicator and the pause until date/time for the ad group (as well as those for any ad(s) belonging to the ad group) is set (Block 534). Finally, if a selected ad group is paused for a given time period, the pause indicator for the ad group is set. The pause period for the ad group is accepted or otherwise set, and a pause period countdown timer is started (Block 536). These acts should be propagated down to any ad(s) belonging to the selected ad group.

Referring back to event block 510, if an ad campaign is selected a further event is checked (Event Block 540). If a selected ad campaign is paused until manual restart, the pause indicator for the ad campaign is set (Block 542). This act should be propagated down to any ad group(s) belonging to the ad campaign, as well as to any ad(s) belonging to such ad group(s). If a selected ad campaign is paused until date/time, the pause indicator and the pause until date/time for the ad campaign are set (Block 544). These acts should be propagated down to any ad group(s) belonging to the ad campaign, as well as to any ad(s) belonging to such ad group(s). Finally, if a selected ad campaign is paused for a given time period, the pause indicator for the ad campaign is set, the pause period for the ad campaign is accepted or otherwise set, and a pause period countdown timer is started (Block 546). These acts should be propagated down to any ad group(s) belonging to the ad campaign, as well as to any ad(s) belonging to such ad group(s).

In each case, user authorization to perform the selected action may be checked.

Naturally, other data structures can be used and other information can be provided or modified, to indicate that the serving of ads, ad groups, and/or ad campaigns is to be paused. At some point, such information is used such that paused ads are either ignored or filtered out.

Having described how ad campaign(s), ad group(s), and/or ad(s) can be paused, ways in which they can be restarted are now described. FIG. 6 is a flow diagram of an exemplary method 600 that may be used to restart a paused ad account, a paused ad campaign, a paused ad group, and/or paused ads. Various branches of the method 600 may be triggered in response to an event (Event Block 610). For example, if a pause until date/time occurs, any ad campaigns, ad groups, and/or ads paused until that date/time are restarted (e g., their pause indicators can be reset) (Block 620). Again, in an environment that arranges ad information hierarchically, restart actions should propagate down through the hierarchy. Referring back to event block 610, if a pause time expires, any ad campaigns, ad groups, and/or ads paused for that time are restarted (e.g., their pause indicators can be reset) (Block 630). In an environment that arranges ad information hierarchically, restart actions should propagate down through the hierarchy. Referring back to event block 610, if an unauthorized user restarts any paused ad campaigns, ad groups, and/or ads, they are restarted (e.g., their pause indicators can be reset) (Block 640). Naturally, in an environment that arranges ad information hierarchically, restart actions should propagate down through the hierarchy.

§4.2.3 Exemplary Apparatus

FIG. 7 is high-level block diagram of a machine 700 that may perform one or more of the operations discussed above. The machine 700 basically includes a processor(s) 710, an input/output interface unit(s) 730, a storage device(s) 720, and a system bus or network 740 for facilitating the communication of information among the coupled elements. An input device(s) 732 and an output device(s) 734 may be coupled with the input/output interface(s) 730.

The processor(s) 710 may execute machine-executable instructions (e.g., C or C++running on the Solaris operating system available from Sun Microsystems Inc. of Palo Alto, Calif. or the Linux operating system widely available from a number of vendors such as Red Hat, Inc. of Durham, N.C.) to perform one or more aspects of the present invention. At least a portion of the machine executable instructions may be stored (temporarily or more permanently) on the storage device(s) 720 and/or may be received from an external source via an input interface unit 730.

In one embodiment, the machine 700 may be one or more conventional personal computers. In this case, the processing unit(s) 710 may be one or more microprocessors. The bus 740 may include a system bus. The storage devices 720 may include system memory, such as read only memory (ROM) and/or random access memory (RAM). The storage device(s) 720 may also include a hard disk drive for reading from and writing to a hard disk, a magnetic disk drive for reading from or writing to a (e.g., removable) magnetic disk, and an optical disk drive for reading from or writing to a removable (magneto-) optical disk such as a compact disk or other (magneto-) optical media.

A user may enter commands and information into the personal computer through input devices 732, such as a keyboard and pointing device (e.g., a mouse) for example. Other input devices such as a microphone, a joystick, a game pad, a satellite dish, a scanner, or the like, may also (or alternatively) be included. These and other input devices are often connected to the processing unit(s) 710 through an appropriate interface 730 coupled to the system bus 740.

The output device(s) 734 may include a monitor or other type of display device, which may also be connected to the system bus 740 via an appropriate interface. In addition to (or instead of) the monitor, the personal computer may include other (peripheral) output devices (not shown), such as speakers and printers for example.

§4.3 Conclusions

As can be appreciated from the foregoing disclosure, the present invention helps advertisers by simplifying the management of interactive-advertisements.

What is claimed is:

1. A computer-implemented method for managing information used to control serving of a set of one or more advertisements, the information including a time period over which the set of one or more ads may be served, wherein said time period is specified by an accepted start time input and an accepted stop time input, the computer-implemented method comprising:
   a) accepting, by a computer system including at least one computer, a selection input for identifying at least a portion of the information;
   b) accepting, by the computer system, a pause input, the pause input being different from the accepted start time and stop time inputs;
   c) setting, by the computer system and responsive to the accepted pause input, a pause indicator for the one or more advertisements associated with the portion of the information identified by the selection input;
   d) updating, by the computer system, the information based on the accepted selection input and the accepted pause input;
   e) storing, by the computer system, the updated information;
   f) pausing, by the computer system, within said time period, the serving of the one or more ads associated with the set pause indicator such that the one or more ads paused will not be served within the time period specified by the accepted start time and stop time inputs, and wherein the pausing of the serving of one or more ads associated with the set pause indicator is independent of whether or not the one or more ads may otherwise be served by an ad system within the time period specified by the accepted start time and stop time inputs;
   g) determining, by the computer system, the existence of a restart event; and
   h) restarting, by the computer system, within said time period, the serving of one or more ads in response to the restart event, such that the one or more ads restarted will be eligible to be served within the time period specified by the accepted start time and stop time inputs.

2. The computer-implemented method of claim 1 wherein the restart event is a manual restart input received after an earlier received pause input.

3. The computer-implemented method of claim 1 wherein the restart event is an expired pause time period tracked by a timer.

4. The computer-implemented method of claim 1 wherein the information is selected from a group consisting of (A) an advertisement, (B) an ad group, (C) an ad campaign, and (D) an account,
  wherein the information used to control the serving of the set of one or more advertisements is organized in a hierarchical structure,
  wherein the selection input identifies at least a portion of the information by identifying a hierarchical level of the information, and
  wherein updates to the hierarchical level identified propagate down to sub-components of the hierarchical level identified.

5. The computer-implemented method of claim 4 wherein the account is located at the highest level of the hierarchy and contains at least one ad campaign,
  wherein each of the at least one ad campaigns contains at least one ad group,
  wherein each of the at least ad groups contains at least one advertisement, and
  wherein the selection input identifies at least portion of the information by identifying at least one of (a) the ad account, (b) one of the at least one ad campaigns, (c) one of the at least one ad groups, and (d) or e of the at least one advertisements.

6. Apparatus for managing information used to control serving of a set of one or more advertisements, the information including a time period over which the set of one or more ads may be served, wherein said time period is specified by an accepted start time input and an accepted stop time input, the apparatus comprising:
  a) at least one processor;
  b) an input for
    1) accepting a selection input for identifying at least a portion of the information, and
    2) accepting a pause input, the pause input being different from the accepted start time and stop time inputs; and
  c) at least one storage device storing program instructions which, when executed by the at least one processor, perform a method including
    1) setting, responsive to the accepted pause input, a pause indicator for the one or more advertisements associated with the portion of the information identified by the selection input,
    2) updating the information based on the accepted selection input and the accepted pause input,
    3) storing the updated information,
    4) pausing, within said time period, the serving of the one or more ads associated with a set pause indicator such that the one or more ads paused will not be served within the time period specified by the accepted start time and stop time inputs, wherein the pausing of the serving of one or more ads associated with the set pause indicator is independent of whether or not the one or more ads may otherwise be served by an ad system within the time period specified by the accepted start time and stop time inputs,
    5) determining the existence of a restart event, and
    6) restarting, within said time period, the serving of one or more ads in response to the restart event, such that the one or more ads restarted will be eligible to be served within the time period specified by the accepted start time and stop time inputs.

7. The apparatus of claim 6 wherein the restart event is a manual restart input received after an earlier received pause input.

8. The apparatus of claim 6 wherein the restart event is an expired pause time period tracked by a timer.

9. The apparatus of claim 6 wherein the information is selected from a group consisting of (A) an advertisement, (B) an ad group, (C) an ad campaign, and (D) an account,
  wherein the information used to control the serving of the set of one or more advertisements is organized in a hierarchical structure,
  wherein the selection input identifies at least a portion of the information by identifying a hierarchical level of the information, and
  wherein updates to the hierarchical level identified propagate down to sub-components of the hierarchical level identified.

10. The apparatus of claim 9 wherein the account is located at the highest level of the hierarchy and contains at least one ad campaign,
  wherein each of the at least one ad campaigns contains at least one ad group,
  wherein each of the at least ad groups contains at least one advertisement, and
  wherein the selection input identifies al least a portion of the information by identifying at least one of (a) the ad account, (b) one of the at least one ad campaigns, (c) one of the at least one ad groups, and (d) one of the at least one advertisements.

* * * * *